United States Patent
Georgi et al.

(10) Patent No.: US 12,017,200 B2
(45) Date of Patent: Jun. 25, 2024

(54) METHOD FOR REMOVING POLYFLUORINATED ORGANIC COMPOUNDS FROM WATER BY MEANS OF AN ADSORBENT AND REGENERATION OF THE LATTER

(71) Applicant: HELMHOLTZ-ZENTRUM FÜR UM-WELTFORSCHUNG GMBH-UFZ, Leipzig (DE)

(72) Inventors: Anett Georgi, Leipzig (DE); Frank-Dieter Kopinke, Leipzig (DE); Katrin Mackenzie, Naundorf (DE); TheViet Nguyen, Hamburg (DE); Silke Woszidlo, Leipzig (DE); Robert Köhler, Leipzig (DE)

(73) Assignee: HELMHOLTZ-ZENTRUM FÜR UM-WELTFORSCHUNG GMBH—UFZ, Leipzig (DE)

( * ) Notice: Subject to any disclaimer, the term of this patent is extended or adjusted under 35 U.S.C. 154(b) by 507 days.

(21) Appl. No.: 17/284,615

(22) PCT Filed: Oct. 29, 2019

(86) PCT No.: PCT/EP2019/079452
§ 371 (c)(1),
(2) Date: Apr. 12, 2021

(87) PCT Pub. No.: WO2020/089192
PCT Pub. Date: May 7, 2020

(65) Prior Publication Data
US 2021/0346862 A1    Nov. 11, 2021

(30) Foreign Application Priority Data

Oct. 30, 2018 (EP) .................. 18203492

(51) Int. Cl.
*B01J 20/18* (2006.01)
*B01J 20/28* (2006.01)
*B01J 20/34* (2006.01)
*C02F 1/28* (2023.01)
*C02F 101/36* (2006.01)

(52) U.S. Cl.
CPC ......... *B01J 20/18* (2013.01); *B01J 20/28016* (2013.01); *B01J 20/3408* (2013.01); *B01J 20/3441* (2013.01); *B01J 20/3458* (2013.01); *B01J 20/3475* (2013.01); *B01J 20/3483* (2013.01); *C02F 1/281* (2013.01); *C02F 2101/36* (2013.01); *C02F 2303/16* (2013.01); *C02F 2303/18* (2013.01)

(58) Field of Classification Search
None
See application file for complete search history.

(56) References Cited

U.S. PATENT DOCUMENTS 5,580,461 A * 12/1996 Cairns .................. B01D 53/75
                                                    210/691
8,419,858 B1 * 4/2013 Haydock .............. C02F 1/725
                                                    134/1

FOREIGN PATENT DOCUMENTS

| CN | 1136468 A | 11/1996 |
| CN | 103991948 B | 2/2016 |
| DE | 102013206066 A1 | 10/2014 |

OTHER PUBLICATIONS

Office Action for Canadian Application No. 3,115,010, mailed on Aug. 25, 2023, 4 pages.
Da Silva-Rackov, Celyna K O , et al., "Degradation of PFOA by hydrogen peroxide and persulfate activated by iron-modified diatomite", Applied Catalysis B: Environmental, Elsevier, pp. 253-259.
Yazaydin, A Özgür , et al., "Computing Adsorbate/Adsorbent Binding Energies and Henry's Law Constants from Molecular Simulations", Environmental Engineering Science, vol. 26, No. 2, pp. 297-303.
International Search Report dated Jan. 8, 2020 cited in PCT/EP2019/079452.
Extended European Search Report dated Jul. 25, 2019 cited in EP 18 20 3492.
Partial European Search Report dated May 9, 2019 cited in EP 18 20 3492.

* cited by examiner

*Primary Examiner* — Chester T Barry
(74) *Attorney, Agent, or Firm* — Perkins Coie LLP; Jordan Becker

(57) ABSTRACT

The invention relates to a method for removing polyfluorinated organic compounds from water by means of an adsorbent and to the regeneration of the latter. According to the invention, at least one zeolite is used as an adsorbent, which is brought into contact with the water and is then regenerated by wet-chemical oxidation, wherein the oxidation is carried out by means of UV irradiation and/or at a pH in the range from pH 2.5-7.5.

21 Claims, No Drawings

METHOD FOR REMOVING POLYFLUORINATED ORGANIC COMPOUNDS FROM WATER BY MEANS OF AN ADSORBENT AND REGENERATION OF THE LATTER

CROSS REFERENCE TO RELATED APPLICATION

This application is a National Stage filing of International Application No. PCT/EP2019/079452, filed on Oct. 29, 2019, and published as WO 2020/089192 on May 7, 2020, which claims priority to EP Application No. 18203492.6, filed on Oct. 30, 2018, each of which is incorporated by reference herein in its entirety.

The invention relates to a method for removing polyfluorinated organic compounds from water by means of an adsorbent.

Polyfluorinated organic compounds (PFCs) are organic compounds having a carbon skeleton, in which hydrogen is partially or completely replaced by fluorine. They frequently consist of a carbon chain having a variable length and a hydrophilic headgroup such as a carboxyl or sulfonyl group. These compounds, which are used as surfactants, are referred to as perfluoroalkyl acids (PFAAs). Thanks to the stability of the C—F-bonding, PFCs are very resistant to biological, chemical or even thermal degradation.

PFCs are artificial, technically synthesized compounds that do not occur in nature. They are used, inter alia, in fire-extinguishing foams, in the paper and textile industry, in the electroplating industry and as components of lubricants and impregnating agents. The number of sites contaminated with PFCs has increased in the past ten years. This also includes contamination of groundwater which, in some cases, already negatively impacts its utilization as a source of drinking water. Perfluoroalkyl carboxylic acids (PFACs) including perfluorooctanoic acid (PFOA) are among the most frequently detected PFCs in groundwater.

There is therefore a considerable demand for efficient technologies for removing PFCs and, in particular, PFACs from contaminated water, including industrial effluents, but also contaminated groundwater.

In accordance with the prior art, adsorptive removal of PFCs from water is carried out using active carbon (AC). The process of using polymer-based adsorbers and regenerating the adsorbers loaded with PFCs is also known.

Due to the low adsorption affinities of various PFCs in combination with competition and scaling effects during the adsorption by natural organic matter (NOM) and/or other inorganic matter and organic compounds in complex water matrices, the operating time of AC adsorbers is comparatively short.

Exhausted active carbon can be regenerated by high-temperature treatment in special preparation plants under specific conditions. However, the disadvantage of this type of regeneration is the high transport and energy costs required.

With regard to chemical degradation of PFACs, it is generally assumed that conventional oxidation methods which use oxidizing agents and oxygen-based radicals such as hydroxyl radicals (On derived from $O_3$, $O_3$/UV, $O_3$/$H_2O_2$ and $H_2O_2$/$Fe^{2+}$, are not suitable for the degradation of PFACs.

By contrast, sulfate radicals ($SO_4^-$), which can be formed by activating peroxydisulfate (PODS, $S_2O_8^{2-}$) or peroxymonosulfate (POMS, $SO_5^{2-}$), for degrading PFACs are known. The persulfates are activated by UV irradiation, heat or transition metals. However, the velocity constants for the reaction of sulfate radicals with PFACs are lower by orders of magnitude than for competing reactions between sulfate radicals and various inorganic compounds such as halide ions ($Cl^-$, Br) and bicarbonate ($HCO_3^-$), which are ubiquitous in groundwater and also occur in most industrial effluents. NOM is another radical scavenger in surface water and groundwater. At the same time, the concentrations of the PFACs in the water to be treated are significantly lower than the concentrations of these water constituents, which leads to high oxidizing agent consumption due to undesirable secondary reactions. These circumstances make direct chemical treatment of water contaminated with PFACs by persulfates very inefficient.

Further restrictions of a direct continuous dosing of persulfate for degrading PFACs are
 i) the contamination of the treated water with high concentrations of sulfuric acid and sulfate as the end product of the oxidation by means of persulfates, and
 ii) the need for continuous energy input for heating large quantities of water or UV activation of the persulfates.

AC-based and polymer-based resins, as the most frequently used adsorbents for PFCs to date on a technical scale, have severe restrictions during the regeneration by wet-chemical oxidation (WCO methods), since these act as radical scavengers themselves and are oxidized, i.e., destroyed, in the process.

These restrictions also apply to sulfate radical-based oxidation which leads to
 i) a high consumption of persulfate (e.g., 0.5 kg PODS per kg AC in order to regenerate chloroform-contaminated AC). Huling S G, Ko S, Park S, Kan E. Persulfate oxidation of MTBE- and chloroform-spent granular active carbon. Journal of Hazardous Materials 2011; 192 (3): 1484-1490, and
 ii) a loss of adsorption capacity during reuse due to oxidative conversion of the AC surface or formation of bound residues between transformation products of PFACs and the AC surface.

Alternative organic adsorbents such as anion exchange resins, for example described in EP 1193242 A1, functionalized organic polymers or immobilized cyclodextrins have been proposed, which, however, due to lack of stability with respect to strong oxidizing agents such as, e.g., sulfate radicals, are likewise not suitable for a wet-chemical oxidation of adsorbed impurities.

DE 102013214514 A1 describes a batch system with ultrafine powdered adsorbents in combination with flocculants in order to remove PFCs from water. These powdery adsorbents are not intended for regeneration, but ultimately form a solid waste to be disposed of.

Adsorption methods for fluorine-containing organic compounds having a carbon skeleton of 2 to 6 carbon atoms using AC are described in U.S. Pat. No. 8,614,351 B2 and U.S. Pat. No. 8,642,804 B2, wherein the consumed AC adsorbing agent is regenerated by heating to moderate temperatures, i.e., preferably to 150° C. This method is not suitable for longer-chain PFACs (having ≥7 C atoms) including PFOA due to its low volatility at moderate temperatures and moderate pH values. In order to make a PFAC compound sufficiently volatile, it must be converted from its salt into its protonated form, which requires extremely acidic pH values (pH<$pK_A$<2).

RU 2006126324 A claims a method in which PFACs are removed from water by adding a non-fluorinated surfactant and adsorbent particles and the adsorbing agent is regenerated by extraction with solvent/water/acid mixtures, which leads to an esterification of PFACs, wherein the esters formed can be obtained from the solvent by distillation. The aim here is to facilitate the recovery of expensive fluorinated surfactants from industrial effluents and the reuse of the latter.

When treating water with traces of PFCs, the loading of the adsorbent is also low at exhaustion. In such cases, a complete destruction instead of a recovery is desirable. However, there are no available methods for efficiently degrading PFCs in the adsorbed state on a suitable adsorbent to date.

The use of a composite adsorbing agent consisting of ultrahigh molecular weight polyethylene, active carbon, sepiolite powder, attapulgite powder, zeolite powder and a foaming agent is described in CN 101992061 A. A regeneration is not disclosed.

It is an object of the present invention to provide a method for removing polyfluorinated organic compounds from water by means of an adsorbent and, preferably, for regenerating the adsorbent, which at least partially remedies the disadvantages of the prior art.

This object is achieved by a method having the features of claim 1. Advantageous configurations are characterized in the subclaims.

According to the invention, the method involves removing polyfluorinated organic compounds from water by means of an adsorbent and the regeneration of the latter, wherein at least one zeolite is used as an adsorbent, which is brought into contact with the water and is then regenerated by wet-chemical oxidation, wherein the oxidation is carried out by means of UV irradiation and/or at a pH in the range from pH 2.5-7.5.

The oxidation by means of UV irradiation is preferably carried out at a wavelength in the range from 240-450 nm and, particularly preferably, in the range from 315-380 nm.

In accordance with a preferred embodiment of the method, the oxidation step for regeneration is preferably carried out at a pH in the range from pH 2.5-7, preferably 3-5.

A subsequent treatment step, in which the pH is raised, preferably to pH 8 up to 10, can preferably be carried out following the oxidation step.

Preferred zeolites are named and described in greater detail below.

The water to be cleaned can originate from different sources, for example from industrial effluents, contaminated groundwater and the like, which does not however limit the method according to the invention.

The bringing of the zeolite into contact with the water can be carried out in accordance with various methods known to the person skilled in the art, for example in fixed-bed or fluidized-bed reactors, with which the cleaned water can also be separated off again without any problems, e.g., by filtration, sedimentation or centrifugation.

The at least one zeolite is preferably separated off from the water prior to the regeneration. Separating off within the framework of the invention does not mean that the zeolite has to be completely anhydrous. Said zeolite can contain residual water quantities that do not interfere during the regeneration.

In the preferred method variant of regeneration by means of wet-chemical oxidation, persulfate and/or atmospheric oxygen, preferably persulfate, is/are used as the oxidizing agent.

The oxidation by means of atmospheric oxygen is deemed to be wet-chemical oxidation, since the adsorbent does not have to be anhydrous and the atmospheric oxygen is conducted through the adsorbent.

The persulfate is preferably peroxydisulfate or peroxymonosulfate, preferably peroxydisulfate, preferably having sodium, potassium or ammonium as the cation.

The wet-chemical oxidation is preferably carried out with a supply of thermal energy, namely at a temperature in the range from 40 to 100° C., preferably in the range from 60 to 80° C.

In accordance with a preferred embodiment of the method according to the invention, the at least one zeolite is loaded with at least one transition metal, selected from the group $Fe^{2+}$, $Fe^{3+}$, $Cu^{2+}$, preferably $Fe^{3+}$ or an alkaline-earth metal, preferably $Ca^{2+}$ or $Mg^{2+}$ by ion-exchange processes known to the person skilled in the art. This can advantageously support the adsorptive bonding of anionic pollutants.

Loading with metal ions does not provide any significant advantages during the oxidation with thermally activated persulfate; by contrast, it is advantageous to use transition metal ions, preferably $Fe^{3+}$, in particular with PFAAs, during oxidation by means of UV irradiation, in which atmospheric oxygen or persulfate is used as the oxidizing agent.

The at least one zeolite can be used in an extremely wide range of variants, preferably as a powder, granular material and/or pellets.

Zeolites are microporous inorganic adsorbents having a regular skeleton and channel system and a high specific surface area. Nowadays, in addition to a few zeolites that occur in nature, a plurality of skeleton types is manufactured synthetically. The modulus, i.e., the $SiO_2/Al_2O_3$ molar ratio of the zeolite defines the charge density on the inner surface of the zeolite, since each Al generates a negative charge. In order to adsorb PFCs on various zeolites, it is known that their adsorption capacities are significantly lower than in the case of other investigated adsorbents (AC), which can be attributed to the poor accessibility of perfluorooctanesulfonic acid and PFOA to the inner surface of the microporous adsorbent. Thus, mesopores and macropores and not micropores, which usually dominate in the zeolites, are suitable for the diffusion and adsorption of PFOA. In a study, only one FAU-type zeolite (NaY) having a modulus=80 showed an adsorption affinity in a range comparable to granular ACs, as an adsorbent for perfluorooctanesulfonic acid in comparatively high residual concentrations (≥1 mg/l): Ochoa-Herrera V, Sierra-Alvarez R. Removal of perfluorinated surfactants by sorption onto granular activated carbon, zeolite and sludge. Chemosphere 2008; 72 (10): 1588-1593. In the case of FAU zeolites, the largest part of the pore volume is formed by so-called supercages at channel crossings, which have larger diameters (1.2 nm) than the channel diameters for all zeolite types (<1 nm).

It is therefore surprising for the person skilled in the art that very good cleaning performances can be attained with zeolites according to the method according to the invention.

The at least one zeolite is preferably selected from the group having the skeleton type: BEA (beta polymorph A type), FER (ferrierite type), MOR (mordenite type), MTW (ZSM-12) and/or FAU (faujasite type).

A zeolite of the BEA type and of the FAU type, which preferably have a modulus of 10 to 200, are particularly preferably used. These have a skeleton with channels that consist of rings of 10 or 12 T atoms (T=Si or Al).

A combination of the zeolite of the BEA type with a zeolite of the FAU type, which preferably each have a modulus of 10 to 200, is also preferred. The two types of zeolite are preferably combined when used as a fixed-bed adsorber such that the latter are spatially separated, i.e., are flowed through in succession. The adsorber bed thus consists of an inlet region filled with FAU zeolite and a second region filled with BEA zeolite. The advantages associated therewith are described below within the framework of the examples.

Observing a defined pH regime leads to particularly advantageous results. An example of this is the degradation of adsorbed PFACs in a WCO process by contacting the loaded zeolite in a solution of PODS or POMS, preferably with sodium peroxydisulfate, and heating to a temperature of 60 to 90° C. for multiple hours. This treatment results in an efficient utilization of the oxidizing agent, protection of the zeolite and complete desorption of the fluoride reaction product.

The following preferred boundary conditions should be emphasized for further clarification. In order to ensure the dominance of sulfate radicals over hydroxyl radicals, a neutral to slightly acidic pH is required (avoidance of the radical crossover reaction $SO_4^{\bullet-}+OH^- \rightarrow SO_4^{2-}+OH\bullet$). Strongly acidic conditions would cause Al or Si to emerge from the zeolite skeleton and, ultimately, destroy it. A slightly alkaline pH is required for the rapid release of fluoride (the mineralization product of PFCs) from the zeolite.

It has been established that fluoride is adsorbed by various zeolites. This could lead to fluoride being transferred from the regeneration step to the next adsorption step, where fluoride passes into the cleaned water. Since restrictions exist regarding fluoride emissions (due to the latter's potential toxicity), it is absolutely essential that such a transmission is avoided. These problems are solved within this invention by a controlled pH regime during the regeneration of the zeolite adsorbing agent with persulfates, which guarantees a stable performance of the zeolites in repeated adsorption regeneration cycles and prevents fluoride being carried over.

The at least one zeolite can be present in the form of a fixed bed or as a suspension in a fluidized bed.

When using the at least one zeolite in the form of a fixed bed, the latter is preferably rinsed with the persulfate solution during the oxidation step. The ratio of the volume of the fixed bed to the volume of the persulfate solution is preferably 4-20.

In accordance with a preferred variant, the fixed bed is periodically rinsed with the persulfate solution.

Alternatively, it is preferred that the zeolite is present as an aqueous suspension.

The method according to the invention offers the following advantages:
  i) increase in the local pollutant concentration at the location of its chemical destruction by multiple orders of magnitude,
  ii) elimination of radical quenchers by special separation of target pollutants and water matrix components, and
  iii) the adsorbing agent is itself chemically stable against aggressive oxidation radicals and other unfavorable conditions such as, for example, different pH values, elevated temperatures.

At the same time, a wet-chemical oxidation (WCO) can be easily performed on site, which means that costs for transport and special high-temperature treatment systems can be avoided.

The advantage of chemical oxidation, compared with adsorbing agent regeneration through solvent extraction, is the fact that PFCs are mineralized (i.e., converted into $CO_2$ and diluted HF) instead of the pollutant being transferred into another phase (extraction solvent), which has to be treated again or safely disposed of.

Consequently, the problem of efficiently removing PFCs and, in particular, PFAAs from water with subsequent complete destruction is solved by combining the steps of adsorption on a zeolite adsorbing agent and the subsequent treatment of the loaded zeolite by WCO with persulfates at a controlled pH.

The method according to the invention has the following advantages:
  i) The zeolite adsorbing agent can be reused for PFC adsorption in multiple cycles without any loss of efficiency.
  ii) The large volume of the treated water remains chemically unaltered since PFCs are only removed by adsorption and therefore no chemicals are added.
  iii) There remains a comparatively small quantity of regeneration solution with environmentally compatible sodium sulfate and fluoride as end products from environmentally hazardous PFCs.

Surprisingly, it has also been shown within the framework of the invention that zeolites and, in particular, BEA zeolite types are excellent adsorbents for PFAAs, although their channel system is microporous and has an inherent negative surface charge which would be expected to repel anionic adsorbates such as PFAAs.

Unexpectedly, BEA zeolites are substantially more efficient adsorbents in the range of the low PFC concentrations relevant to the method according to the invention than zeolites of the FAU type.

An optimal adsorption performance over a broad concentration range of $10^{-6}$ to $10^2$ mg/l of PFCs can thus, as already described, be made possible by a suitable combination of various zeolite types.

These zeolites allow access to negatively charged persulfate oxidizing agent species for chemical degradation and, ultimately, make possible the mineralization of adsorbed PFCs. A person skilled in the art would expect the electrostatic repulsion between zeolite surfaces and involved types of pollutants and reactants, which are all anions, in combination with pore size restrictions within microporous zeolites, to strongly counter the feasibility of the method according to the invention.

However, the oxidation of PFCs which are adsorbed in the zeolite can lead to problems since—as a function of the zeolite loading level—large quantities of sulfuric acid are produced from the persulfate decomposition as well as hydrofluoric acid from the PFC degradation. Improper operation can result in the valuable zeolite being damaged and losing its adsorption efficiency due to significant leaching out of Si and/or Al from the zeolite structure and destruction of the pore structure of the zeolite.

In summary, the main ideas of the invention are to bring together high local concentrations of the two reactants (pollutant and oxidizing agent) in a microporous adsorbent and to initiate a chemical degradation reaction there under mild reaction conditions, which can be realized on site within the framework of the usual water conditioning plants. Due to the high and selective local accumulation of the striven-for PFC pollutants, the oxidizing agent can be used with a substantially higher efficiency than would be achievable during the direct treatment of the water phase. This approach works surprisingly well, although all of the substances, namely the zeolite surface, persulfate and PFAAs are negatively charged under reaction conditions and should accordingly repel each other instead of preferably coming together.

Unless otherwise stated in the individual case, the various embodiments of the invention indicated in this application can be advantageously combined with one another.

The invention is explained in greater detail below with the aid of examples.

EXAMPLE 1/PREFERRED VARIANT OF THE METHOD WITH A FIXED-BED ADSORBER

The method is performed using a classic fixed-bed adsorber, through which the water to be treated flows. The at least one zeolite is present in the form of granular material in the size range of 0.3-10 mm.

In a preferred embodiment of the invention, the type of zeolite or the combination of the latter is selected, based on the inflow concentration of PFAAs into the water to be treated.

For a total concentration of PFAAs of approx. 2 mg/l, the adsorber bed consists of an inlet region filled with FAU zeolite (near the inlet) and a second region (near the discharge) filled with BEA zeolite. The FAU-type zeolite is responsible for the absorption of high quantities of PFCs, while the BEA-type zeolite acts as a so-called 'police adsorber' which further reduces the residual concentration of PFCs in the aqueous phase to very low values.

This approach advantageously combines the different adsorption behavior of the two zeolite types towards PFCs. If the zeolite adsorber has collected a specific quantity of PFCs by adsorption or a specific, limiting concentration of PFCs in the effluent is achieved, the adsorber bed is temporarily separated from the water flow and contacted with persulfate. This means that a persulfate solution is rinsed into the fixed-bed adsorber and recirculated via a reservoir with the aid of a pump, wherein the ratio of adsorber bed volume to the liquid volume in the reservoir is in the range from 4 to 20.

The adsorber bed is heated by an external heat source for a period of time of 5 to 48 hrs (regeneration time) to a temperature between 50 and 90° C. The reservoir container is not heated and, if necessary, is kept at temperatures<40° C. by cooling.

The reservoir solution is monitored in terms of persulfate concentration and pH, and a base is added in order to keep the pH in a range from pH=2.5-7.5, preferably in a range from pH=2.5-7 and, particularly preferably, in a range from pH=3-5.

The flow rate for returning the persulfate solution through the adsorber bed is set so that a dwell time in the adsorber of 5 to 30 minutes, preferably 10 minutes, is achieved.

The progress of the degradation of the PFC was tracked in the present example by analyzing the fluoride released in the reservoir solution. The fluoride concentration was measured by installing a measuring cell having an integrated fluoride-selective electrode or externally by utilizing an ion chromatograph.

Following the oxidation phase, the persulfate-containing regeneration solution is replaced by a slightly alkaline washing solution (pH=8-10), while the recirculation through the cooling-down adsorber is continued for 1 to 5 hrs.

Following this last treatment, the zeolite adsorber can be reused for the next adsorption cycle with contaminated water.

The continuous regeneration process described above works reliably, but has an inherent restriction: as a result of the thermal activation of persulfates, the reactive sulfate radicals are created in the entire heated water volume, i.e., in the intraparticle pore water and in the intermediate particle water. However, the target pollutant is accumulated in the intraparticle pore volume of the zeolite pellet. Some of the short-lived radicals generated do not hit the target molecules. They are "wasted".

In order to minimize this loss of efficiency, a preferred version of the regeneration method aims to minimize the proportion of interparticle water in favor of the intraparticle water. To this end, the zeolite fixed bed is repeatedly washed with fresh persulfate solution in short rinsing cycles (for a few minutes), followed by emptying phases. The spontaneous discharge of the majority of the interparticle persulfate solution can be supported by briefly injecting gas from above through the fixed bed. In this way, the ratio between the two water fractions can be significantly shifted in favor of the desired reaction space, the intraparticle pore volume. The consumption of oxidizing agent (persulfate) is thus significantly decreased.

EXAMPLE 2/PREFERRED VARIANT OF THE METHOD WITH ADSORBER SUSPENSION

Powdered zeolite (particles in the nm to µm size range) is added to the water contaminated with PFCs and then separated from the clean water phase by a suitable phase separation technique (filtration, sedimentation or centrifugation). This can be carried out in batch mode with static filtration or sedimentation or in continuous mode with cross-flow filtration using suitable membrane or ceramic filters.

The zeolite-free water, from which PFCs have been removed by adsorption, is carried away.

The wet zeolite cake loaded with PFCs or the concentrated zeolite suspension are regenerated by treatment with persulfate. To this end, the wet zeolite cake or the concentrated zeolite suspension is mixed with a salt or a concentrated solution of PODS or POMS, preferably sodium peroxydisulfate, which leads to a concentrated suspension having a solid/water ratio of 0.05 to 0.5 kg/l, which is continuously stirred and heated for a period of time of 5-48 hrs (oxidation period) to a temperature between 50 and 90° C.

Alternatively or additionally, persulfate is activated by irradiation with UV light (preferably in the wavelength range from 240 to 280 nm) during the oxidation time.

The pH of the suspension during the oxidation is kept in a range from 2.5-7.5, preferably in a range from pH=2.5-7.5, particularly preferably in a pH=3-5, by adding a base. As a subsequent treatment following the oxidation period, a base is added in order to raise the pH to a range of pH=8-10 while the stirring is continued for 1 to 5 hrs.

Following this last treatment, the zeolite is separated off from the regeneration solution by sedimentation or filtration and can be used for the next adsorption cycle.

The regeneration method described works reliably, but is subject to the same restriction as the method described in Example 1, namely the parasitic degradation of valuable oxidizing agent (persulfates) outside of the preferred reaction space.

Therefore, an alternative version of the zeolite regeneration aims to minimize the interparticle water content, e.g., by centrifugation of the zeolite suspension. The centrifugation sediment, which still contains persulfate, is then thermally treated at 50 to 90° C., cooled down and washed either with fresh persulfate solution or with slightly alkaline water (in order to detach the fluoride formed). The next regeneration cycle can then be started by centrifugation. Only the interparticle water is expelled by centrifugation, but not the intrapore water.

EXAMPLE 3/REMOVAL OF PFOA FROM WATER

The adsorption of PFOA on different types of zeolite (all having moduli in the range from 15-40) was determined in batch experiments, wherein 500 mg/l of the zeolite powder was added to the process water contaminated with 1 mg/l PFOA. The remaining PFOA concentration in the water phase was determined by LC-MS (liquid chromatography-mass spectrometry) analysis following shaking for 1 day in order to establish equilibrium and subsequent phase separation by centrifugation.

Table 1 shows the results of the water conditioning.

| Zeolite scaffold type | Residual fraction of PFOA in water (%) following treatment | PFOA loading of zeolite (mg/g) | Residual concentration of PFOA in water (mg/l) |
| --- | --- | --- | --- |
| FAU | 55.0 | 0.90 | 0.55 |
| BEA | 0.7 | 1.99 | 0.007 |
| Fe-BEA (loaded with $Fe^{2+/3+}$ by ion exchange, Fe content 1.5% by mass) | 0.3 | 1.99 | 0.003 |

Obviously, the various zeolite types differ significantly in their sorption affinity with respect to PFOA. Thus, the zeolite types BEA and Fe-BEA make it possible to effectively separate off PFOA in the range of low concentrations.

EXAMPLE 4/OXIDATIVE REGENERATION OF A ZEOLITE POWDER IN SUSPENSION IN BATCH MODE 1 g of a zeolite powder having a BEA skeleton type and modulus 30 with 1.3% by mass Fe (loaded by ion exchange) was added to 1 l of process water having 0.1 mg/l PFOA, and stirred for 4 hrs. The zeolite was then separated off with adsorbed PFOA by centrifugation, while the cleaned water phase having <0.1 μg/l PFOA was disposed of. 5 ml of a solution of 0.15 M sodium peroxydisulfate in water was added to the PFOA-loaded zeolite, which resulted in a solid/water ratio of 0.2 kg/l. The mixture was heated, with shaking for 24 hrs, to a temperature of 70° C. During this time, the pH of the suspension was kept in the range from pH 3 to 5 by adding NaOH solution. An aliquot of the suspension was then extracted, diluted to a solid/water ratio of 0.02 kg/l with deionized water, the pH was adjusted to 10 by adding NaOH, and the suspension was centrifuged: the fluoride concentration in the clear aqueous phase was determined by ion chromatography.

The fluoride concentration detected in the water phase corresponds to a yield of (97±5)% of the total fluoride originally present as PFOA, which demonstrates that the PFOA has been completely mineralized. The zeolite was reused for the adsorption of PFOA, as described above, in multiple adsorption-oxidation cycles without significantly affecting the adsorption performance.

EXAMPLE 5/FIXED-BED ZEOLITE ADSORBER WITH REGENERATION DURING CONTINUOUS RINSING MODE

A water-jacketed glass column (ID=3 cm, l=30 cm) was filled with 200 g of a pelletized zeolite having a BEA skeleton type and modulus 30, which contained 1.3% by mass of Fe (introduced by ion exchange). Process water having a PFOA content of 100 μg/l was pumped through the column at a flow rate of 10 ml/min. At a throughput of 1500 l, the effluent emerging from the column had a PFOA concentration<0.01 μg/l. During this time, the zeolite was loaded with 0.15 g PFOA.

The zeolite fixed bed was then regenerated by flushing it with a solution of sodium peroxydisulfate (0.45 M) in a circuit having a connected reservoir. During this regeneration phase, the adsorber bed was heated to a temperature of 70° C.

A container having a total volume of 100 ml, which initially contained 50 ml deionized water and 5.3 g of the oxidizing agent, was used as the reservoir. The direction of flow through the zeolite column was the same as during the adsorption step (upward or downward). The pH of the solution in the reservoir was kept in a range from pH 3-5 by an automatic titration system (having 2 M NaOH). Following 30 hours' regeneration, the pH of the reservoir solution was raised to pH 10 and kept constant for a further hour during the recirculation of the solution through the column. Thereafter, the reservoir solution was analyzed by means of ion chromatography.

The fluoride concentration established corresponded to >90% of the total fluoride originally present (as PFOA loading) on the zeolite, which indicates a virtually complete mineralization of PFOA. The total concentration of perfluoroalkanoic acids (PFOA and shorter-chain oxidation intermediate products) in the reservoir solution was <0.1 μg/l.

This proves that not only the target pollutant PFOA, but also shorter-chain fluorinated acids formed as intermediate products have been degraded. Thereafter, the reservoir solution was disposed of and the zeolite column was reused for the next adsorption cycle, wherein 1500 l of process water was again treated with 100 μg/l PFOA, wherein an effluent concentration of <0.01 μg/l was achieved.

EXAMPLE 6/FIXED-BED ZEOLITE ADSORBER WITH REGENERATION IN PORE VOLUME EXCHANGE MODE

A fixed-bed adsorber column was loaded with PFOA as described in Example 3. The zeolite was then regenerated by the following method: The column was heated to 90° C. It was then rinsed with 100 ml of a 0.1 M sodium peroxydisulfate solution. After 5 minutes, the column was emptied by means of a bottom valve. The residual solution was removed from top to bottom by a short pulse by means of compressed air. The persulfate solution collected (approx. 50 ml) was stored at ambient temperature for the next rinsing process. The heated column was kept at the regeneration temperature for a further 10 minutes. It was then filled with 50 ml of a mixture of collected and fresh persulfate solution (0.05 M) for 5 minutes, which was pre-adjusted to a virtually neutral pH with NaOH. This periodic filling and dehydration of the zeolite column was repeated multiple times until the fluoride content in the dehydrating solution had dropped below a limit of 1 μg/l. The quantity of persulfate, which was necessary to achieve 90% mineralization of the adsorbed PFOA, was approximately half the quantity which was required in Example 3.

EXAMPLE 7/USE OF AN ADSORBER SUSPENSION WITH REGENERATION BY A COMBINATION OF OXIDATION WITH ATMOSPHERIC OXYGEN BY MEANS OF UV IRRADIATION AND SUBSEQUENT OXIDATION WITH PERSULFATE 0.2 g of a zeolite powder having a BEA skeleton type and modulus 30 with 1.3% by mass Fe (introduced by ion exchange) was added to 1 l of process water having 0.02 mg/l PFOA, and stirred for 4 hrs. The zeolite was then separated off with adsorbed PFOA by centrifugation, while the cleaned water phase was removed with <0.1 µg/l PFOA. For the regeneration step, 100 ml of deionized water was added to the PFOA-loaded zeolite, which resulted in a solid/water ratio of 2 g/l. This regeneration suspension was placed in a beaker and irradiated from above with a UVA lamp (emission spectrum in the range from 315 to 390 nm) for 24 hrs. This suspension was then centrifuged and the zeolite obtained was used to adsorb PFOA again, as described above, without significant losses in the separation efficiency in multiple adsorption-oxidation cycles. The aqueous phase from the regeneration step does not contain any detectable PFOA (<0.001 µg/l), but rather shorter-chain degradation products, such as perfluorobutanoic acid, which were detected by means of LC-MS analysis. The regeneration solution was further treated to completely mineralize the PFOA degradation products. This was done by adding a small quantity of sodium peroxydisulfate (1 mM) and irradiation with a UVC lamp (254 nm emission wavelength) for 4 hrs. Thereafter, the total concentration of all of the fluorinated organic compounds in the aqueous phase was <0.1 µg/l.

This example illustrates that following adsorption on a BEA-type zeolite, which contains iron introduced by ion exchange, PFOA can be degraded solely by contact with oxygen from the air by means of irradiation with UVA light (similar to the solar UV spectrum).

The invention claimed is:

1. A method for removing polyfluorinated organic compounds from water by use of an adsorbent and the regeneration of the latter, wherein at least one zeolite is used as an adsorbent, which is brought into contact with the water and is then regenerated by wet-chemical oxidation, and wherein the oxidation is carried out by use of UV irradiation and at a pH in the range from pH 2.5-7.5.

2. The method according to claim 1, wherein the at least one zeolite is separated from the water prior to the regeneration.

3. The method according to claim 1, wherein persulfate and/or atmospheric oxygen is/are used as the oxidizing agent.

4. The method according to claim 3, wherein peroxydisulfates or peroxymonosulfates having sodium, potassium or ammonium as the cation are used as the persulfate.

5. The method according to claim 1, wherein the oxidation is thermally activated.

6. The method according to claim 1, wherein the zeolite is loaded with transition metals selected from the group $Fe^{2+}$, $Fe^{3+}$, and $Cu^{2+}$.

7. The method according to claim 1, wherein the oxidation by use of UV irradiation is carried out at a wavelength in the range from 220-450 nm.

8. The method according to claim 1, wherein the at least one zeolite is loaded with metal cations having a valency of ≥2.

9. The method according to claim 1, wherein the at least one zeolite is used in the form of a powder, granular material and/or pellets.

10. The method according to claim 1, wherein the at least one zeolite is selected from the group: beta polymorph A (BEA) type zeolites, ferrierite (FER) type zeolites, mordenite (MOR) type zeolites, mobile twelve (MTW) type zeolites and/or faujasite (FAU) type zeolites.

11. The method according to claim 10, wherein the at least one zeolite is of the BEA type.

12. The method according to claim 10, wherein the at least one zeolite is a combination of the BEA type and of the FAU type.

13. The method according to claim 1, wherein the oxidation step is carried out at a pH in the range from pH 2.5-7 and that, following the oxidation step, a subsequent treatment step is preferably carried out, in which the pH is increased.

14. The method according to claim 1, wherein, following the oxidation step, a subsequent treatment step is carried out, in which the pH is increased.

15. The method according to claim 1, wherein the at least one zeolite is present as a fixed bed or as a suspension.

16. The method according to claim 15, wherein the fixed bed is rinsed with a persulfate solution during the oxidation step.

17. The method according to claim 16, wherein the ratio of the volume of the fixed bed to the volume of the persulfate solution is 4-20.

18. The method according to claim 16, wherein the fixed bed is rinsed periodically with the persulfate solution.

19. The method according to claim 1, wherein the zeolite is present in an aqueous suspension.

20. A method for removing polyfluorinated organic compounds from water by use of an adsorbent and the regeneration of the latter, wherein at least one zeolite is used as an adsorbent, which is brought into contact with the water and is then regenerated by wet-chemical oxidation, and wherein the oxidation is carried out by use of UV irradiation.

21. A method for removing polyfluorinated organic compounds from water by use of an adsorbent and the regeneration of the latter, wherein at least one zeolite is used as an adsorbent, which is brought into contact with the water and is then regenerated by wet-chemical oxidation, and wherein the oxidation is carried out at a pH in the range from pH 2.5-7.5.

* * * * *